United States Patent
Oshima

(10) Patent No.: US 6,570,559 B1
(45) Date of Patent: *May 27, 2003

(54) INFORMATION DISPLAY APPARATUS, AND DISPLAY STATE DETECTION METHOD, DISPLAY STATE ADJUSTMENT METHOD AND MAINTENANCE MANAGEMENT METHOD THEREFOR

(75) Inventor: Junichi Oshima, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,615

(22) Filed: May 14, 1998

(30) Foreign Application Priority Data

May 15, 1997 (JP) .............................. 9-125530

(51) Int. Cl.[7] .................................. G09G 5/00
(52) U.S. Cl. ...................... 345/204; 345/207
(58) Field of Search ................ 345/204, 207, 345/60, 102, 74, 75, 84, 173

(56) References Cited

U.S. PATENT DOCUMENTS

| | | | | |
|---|---|---|---|---|
| 4,638,309 A | * | 1/1987 | Ott ............................ 340/752 |
| 5,079,544 A | * | 1/1992 | DeMond et al. ............ 340/701 |
| 5,296,868 A | * | 3/1994 | Itami et al. .................... 345/7 |
| 5,300,942 A | * | 4/1994 | Dolgoff ........................ 345/32 |
| 5,675,356 A | * | 10/1997 | Ooki et al. ................. 345/104 |
| 5,696,529 A | * | 12/1997 | Evanicky et al. ........... 345/126 |
| 5,745,085 A | * | 4/1998 | Tomio et al. ................. 345/63 |
| 5,748,865 A | * | 5/1998 | Yamamoto et al. ......... 395/123 |
| 5,805,146 A | * | 9/1998 | Jaeger et al. ............... 345/172 |
| 5,850,215 A | * | 12/1998 | Kamiya et al. ............. 345/204 |
| 5,877,751 A | * | 3/1999 | Kanemitsu et al. ......... 345/173 |
| 5,896,119 A | * | 4/1999 | Evanicky et al. ............. 345/87 |
| 6,118,435 A | * | 9/2000 | Fujita et al. ................ 345/173 |

FOREIGN PATENT DOCUMENTS

| | | | | |
|---|---|---|---|---|
| DE | 4129846 | 3/1993 | ............ G09F/9/35 |
| JP | 5119739 | 5/1993 | ............ G09G/3/28 |
| JP | 7104717 | 4/1995 | ............ G09G/3/36 |
| JP | 7335385 | 12/1995 | ........... H05B/41/16 |

\* cited by examiner

*Primary Examiner*—Vijay Shankar
(74) *Attorney, Agent, or Firm*—Jay H. Maioli

(57) ABSTRACT

The invention provides a display state detection method which allows the display state of an information display apparatus to be supervised accurately without giving any obstacle to a user, a display state adjustment method and a maintenance management method by which the display state can be kept good as well as an information display apparatus. Optical sensors are disposed on the rear face side of a plasma display panel and catch rear face side outgoing light, which increases in proportion to the outgoing light amount to the display face side of the plasma display panel, to detect a panel display state, and the display state of the plasma display panel is automatically adjusted based on a result of the detection. When adjustment is impossible, the apparatus itself outputs an alarm and accumulates an adjustment history and/or a failure history. The presence of the optical sensors does not make an obstacle when the display screen is observed, and there is no need to effect operation to arrange an optical sensor and connect it to an adjustment equipment for exclusive use each time adjustment is to be performed. Since the display state of the plasma display panel is detected directly by the optical sensors, the accuracy in detection is high.

8 Claims, 9 Drawing Sheets

| DEVICE ID | x x x x x |
|---|---|
| ACCUMULATED ENERGIZATION TIME | x x x x x |

| ADJUSTMENT HISTORY DATA | DATE TIME | ADJUSTMENT ITEM | ADJUSTMENT VALUE |
|---|---|---|---|
| | x x x x x | x x x x x | x x x x x |
| | x x x x x | x x x x x | x x x x x |
| | x x x x x | x x x x x | x x x x x |
| | ⋮ | ⋮ | ⋮ |

| FAILURE HISTORY DATA | DATE TIME | FAILURE CONTENTS | COUNTERMEASURE CONTENTS |
|---|---|---|---|
| | x x x x x | x x x x x | x x x x x |
| | x x x x x | x x x x x | x x x x x |
| | ⋮ | ⋮ | ⋮ |

INFORMATION DISPLAY APPARATUS, AND DISPLAY STATE DETECTION METHOD, DISPLAY STATE ADJUSTMENT METHOD AND MAINTENANCE MANAGEMENT METHOD THEREFOR

BACKGROUND OF THE INVENTION

1. Field of the Invention

This invention relates to an information display apparatus provided with a light emitting display plate of the panel type wherein internally generated light is radiated to both of the front and rear face sides as well as a display state detection method for detecting a display state of the information display apparatus, a display state adjustment method for adjusting the display state of the information display apparatus, and a maintenance management method for the information display apparatus.

2. Description of the Related Art

Conventionally, for video display apparatus such as television receivers and computer display units, an apparatus such as a CRT (cathode ray tube) or an LCD (liquid crystal display device) is used popularly. In recent years, also a display device of the panel type which by itself emits light in response to application of voltage thereto such as plasma display panel (PDP) has been put into practical use. Since those display devices have a tendency that the display state such as a luminance (brightness) or color temperature is gradually varied by aged deterioration or the like as a result of use for a long time, adjustment must be performed occasionally in order to keep the display state in the best.

Conventionally, adjustment of a screen display state such as a brightness or color temperature of such a display apparatus as described above is performed periodically or as occasion calls by a maintenance engineer or a user. For such adjustment, two methods are popularly used including a method wherein optical sensors are suitably arranged at suitable positions of the display face side (observer side) and output signals from the sensors are received by an adjustment apparatus for exclusive use to directly detect a display image and then adjustment is performed suitably so that an appropriate display image may be obtained and another method wherein a display state is detected indirectly by detecting current, voltage or a like parameter which participates in the display to effect adjustment.

However, while the former one of the two methods described above is advantageous in that it allows adjustment with a high degree of accuracy because an image displayed actually is monitored directly, it is disadvantageous in that, since the optical sensors are arranged on the display face side, part of the display information is intercepted by the optical sensors. Particularly in an application wherein complete information display is always required to a user such as, for example, a guide display unit in a public equipment such as the yard of a station or the departure and arrival terminal of an airport or in a shopping center such as a department store, any method by which part of display information is intercepted even for a while cannot be adopted. Further, with the former method described above, since installation of an adjustment apparatus for exclusive use is required in addition to installation of the optical sensors upon adjustment, much time is required for preparations prior to the adjustment. Accordingly, in such an equipment as mentioned above wherein a very large number of guide display units are provided, it is almost impossible for all of them to be always managed appropriately by a maintenance engineer or engineers, and it is difficult to rapidly find out a display unit which has failed or has suffered from deterioration in picture quality and take a countermeasure against such failure or picture quality deterioration.

On the other hand, the latter method is realized, where, for example, a CRT display unit is taken as an example, in such a form that current flowing through an electron gun is supervised to detect a display state of the tube screen (fluorescent screen). With the method, however, the display state is merely monitored indirectly from current which participates in the display, and if the current and the display state are brought out of a correct corresponding relationship by some factor such as, for example, degradation of the fluorescent substance or leak of current, then the accuracy in detection of the display state, and hence the accuracy in adjustment, is degraded significantly.

In this manner, in a conventional video display apparatus, it is difficult to normally keep a good display state or discover a failure rapidly, and if it is tried to overcome the problem just described using any of the conventional methods, a high cost and much time are required and it cannot be avoided that some obstacle to the business or to the service to a user occurs.

SUMMARY OF THE INVENTION

It is an object of the present invention to provide a display state detection method which allows the display state to be supervised accurately and allows a countermeasure to be taken rapidly without giving any obstacle to a user. It is another object of the present invention to provide a display state adjustment method and a maintenance management method by which a display condition can be kept good without giving any obstacle to a user. It is a further object of the present invention to provide an information display apparatus to which the methods are applied.

In order to attain the objects described above, according to an aspect of the present invention, there is provided an information display apparatus, comprising a light emitting display plate having a shape of a flat plate for generating light in the inside thereof in response to information given thereto and radiating the internally generated light to both of the front and rear face sides, and display state detecting light detection means provided on the rear face side different from a display face of the light emitting display plate.

The information display apparatus may further comprise automatic adjustment means for automatically adjusting the display state of the light emitting display plate based on display state detection information obtained by the light detection means. Preferably, the automatic adjustment means outputs an alarm when the adjustment thereby has failed. Here, the information display apparatus may further comprise maintenance management information holding means for holding apparatus maintenance management information including a history of adjustment performed by the automatic adjustment means. In this instance, the information display apparatus may further comprise outputting means for outputting the apparatus maintenance management information held by the maintenance management information holding means or the display state detection information outputted from the light detection means to the outside. The outputting means may be connected to a central control unit provided for controlling and managing a plurality of information display apparatus of a similar type.

In the information display apparatus, of the light radiated to both of the front and rear face sides of the light emitting display plate, the light radiated to the rear face side which is not the display face is detected. Further, the display state of the light emitting display plate is automatically adjusted based on a result of the detection. Besides, the apparatus maintenance management information including an adjustment history is held. Furthermore, the apparatus maintenance management information or the display state detection information is outputted to the external central control apparatus or the like.

With the information display apparatus described above, since the light detection means is provided on the rear face side of the light emitting display plate such that, of the light radiated to both of the front and rear face sides of the light emitting display plate, the light radiated toward the rear face side which is not the display face may be detected, upon ordinary information display, the information display apparatus is advantageous in that the presence of the light detection means does not make an obstacle at all when the display screen is observed. Besides, since an operation to dispose an optical sensor and connect it to an adjustment apparatus for exclusive use each time adjustment is to be performed is not required, the information display apparatus is advantageous also in that supervision of the display state is facilitated very much and the cost required for the supervision can be reduced remarkably. Further, since, different from a method wherein the display state is detected indirectly from current or a like parameter which participates in the display, the display state of the light emitting display plate is detected directly by the light detection means, the information display apparatus is advantageous further in that detection with a high degree of accuracy is possible.

Where the display state of the light emitting display plate is automatically adjusted based on a result of the detection by the light detection means, the information display apparatus is advantageous in that the display state can be kept optimum without requiring manual operation as in the prior art. Further, where the apparatus maintenance management information including an adjustment history is held, the information display apparatus is advantageous in that it is possible to grasp the condition of use or the deterioration condition of the apparatus or effect prediction of the life of the apparatus and so forth precisely based on the information. Particularly where the apparatus maintenance management information or display state detection information is outputted to the outside, it is possible to effect grasping of the condition of the apparatus and so forth from the outside.

According to another aspect of the present invention, there is provided a display state detection method for an information display apparatus comprising the steps of providing light detection means on the rear face side different from a display face of the light emitting display plate, and detecting a display state of the light emitting display plate based on an output of the light detection means.

In the display state detection method for an information display apparatus, of the light radiated to both of the front and rear face sides of the light emitting display plate, the light radiated to the rear face side which is not the display face is detected.

With the display state detection method for an information display apparatus, since, of the light radiated to both of the front and rear face sides of the light emitting display plate, the light radiated to the rear face side which is not the display face is detected by the light detection means provided on the rear face side of the light emitting display plate, the display state detection method is advantageous in that the presence of the light detection means does not make an obstacle at all when the display screen is observed, and besides, supervision of the display state is facilitated very much and detection of the display state with a high degree of accuracy is possible.

According to a further aspect of the present invention, there is provided a display state adjustment method for an information display apparatus, comprising the steps of providing light detection means on the rear face side different from a display face of the light emitting display plate, detecting a display state of the light emitting display plate based on an output of the light detection means, and automatically adjusting the display state of the light emitting display plate adjusted based on a result of the detection by the light detection means.

In the display state adjustment method for an information display apparatus, of the light radiated to both of the front and rear face sides of the light emitting display plate, the light radiated to the rear face side which is not the display face is detected, and the display state of the light emitting display plate is automatically adjusted based on a result of the detection.

With the display state adjustment method for an information display apparatus, since, of the light radiated to both of the front and rear face sides of the light emitting display plate, the light radiated to the rear face side which is not the display face is detected by the light detection means provided on the rear face side of the light emitting display plate and the display state of the light emitting display plate is automatically adjusted based on a result of the detection, the display state adjustment method is advantageous in that the display state can be kept optimum without requiring manual operation as in the prior art.

According to a still further aspect of the present invention, there is provided a maintenance management method for an information display apparatus, comprising the steps of providing light detection means on the rear face side different from a display face of the light emitting display plate, detecting a display state of the light emitting display plate based on an output of the light detection means, automatically adjusting the display state of the light emitting display plate adjusted based on a result of the detection by the light detection means and holding apparatus maintenance management information including a history of the automatic adjustment, and performing maintenance management of the information display apparatus suitably referring to the apparatus maintenance management information.

The maintenance management method for an information display apparatus may further comprise the step of sending out the apparatus maintenance management information held by the maintenance management information holding means or the display state detection information outputted from the light detection means to a central control unit provided for controlling and managing a plurality of information display apparatus of a similar type so that the maintenance management of the information display apparatus may be performed by the central control unit.

In the maintenance management method for an image display apparatus, the held apparatus measurement management information including an adjustment history is suitably referred to to effect maintenance management of the information display apparatus. Further, the apparatus maintenance management information or the display state detection information is sent out to the central control apparatus, and maintenance management of the information display apparatus is performed by the central control apparatus.

With the maintenance management method for an image display apparatus, since, of the light radiated to both of the front and rear face sides of the light emitting display plate, the light radiated to the rear face side which is not the display face is detected by the light detection means provided on the rear face side of the light emitting display plate and the display state of the light emitting display plate is automatically adjusted based on a result of the detection and besides the apparatus maintenance management information including a history of the adjustment is held, the maintenance management method is advantageous in that maintenance management of the apparatus can be performed precisely based on the information such that a condition of use or a degradation condition of the apparatus is grasped or prediction of the life of the apparatus and so forth can be performed. Particularly where the apparatus maintenance management information or the display state detection information is sent out to the central control apparatus and maintenance management of the information display apparatus is performed by the central control apparatus, display states and so forth of a large number of information display apparatus can be managed in a concentrated manner from a remote place.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a view illustrating contents of device state management data stored in a non-volatile memory of the main controller of FIG. 4;

DETAILED DESCRIPTION OF THE PREFERRED EMBODIMENT

Figure 1:
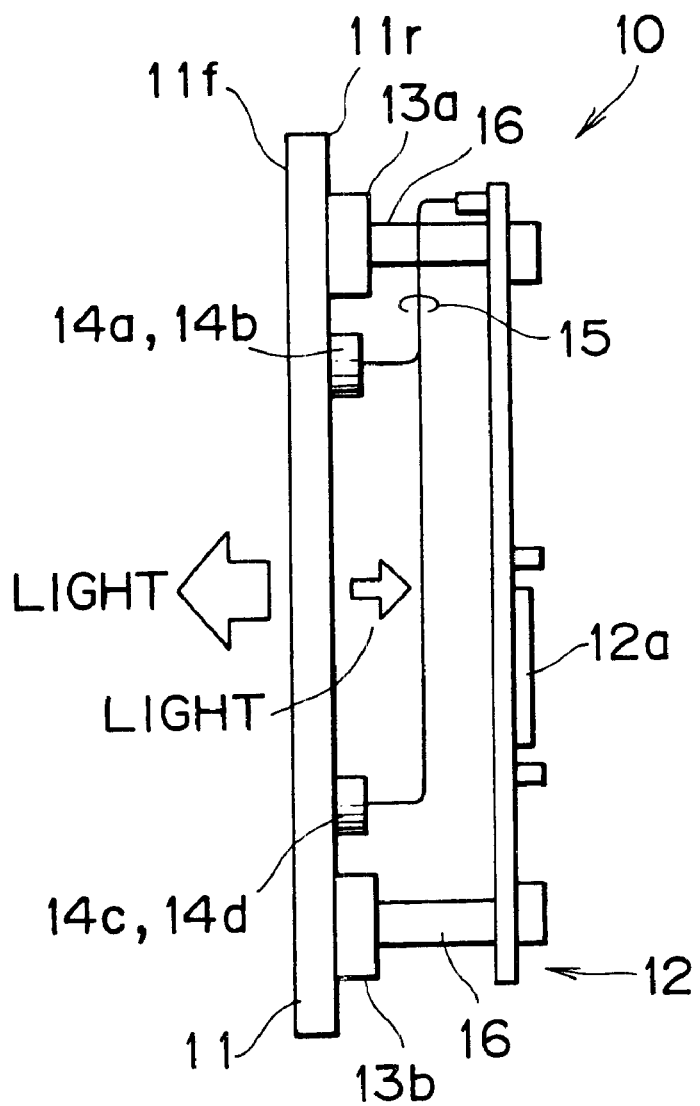
FIG. 1 is a side elevational view showing an appearance of a plasma display panel unit as an information display apparatus according to an embodiment of the present invention.
Figure 2:
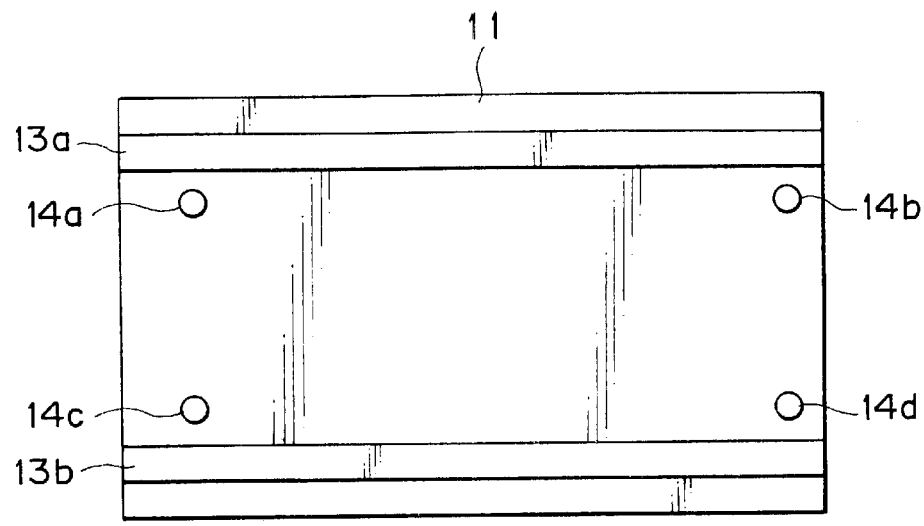
FIG. 2 is a plan view showing an appearance of the plasma display panel unit of FIG. 1.

Referring first to FIGS. 1 and 2, there is shown, in side elevation and rear elevation, respectively, an appearance of an information display apparatus according to a preferred embodiment of the present invention. It is to be noted that, since the display state detection method, display state adjustment method and maintenance management method for an information display apparatus according to the present invention are embodied by the information display apparatus shown in FIGS. 1 and 2, they are described below together.

Referring first to FIG. 1, the information display apparatus is formed as a plasma display panel (PDP) unit 10 which includes a plasma display panel (PDP) 11 and a control board 12. It is to be noted that the control board 12 is omitted in FIG. 2. The plasma display panel 11 is an image information displaying panel having such a sectional structure as shown, for example, in FIG. 3, and has reinforcement members 13a and 13b and four optical sensors 14a to 14d mounted on a rear face 11r thereof. The optical sensors 14a to 14d are color sensors each formed from, for example, a photodiode or a like element and can detect the colors of R (red), G (green) and B (blue) independently of one another. The optical sensors 14a to 14d are individually connected to a sensor amplifier 18 (FIG. 4), which will be hereinafter described, on the control board 12 over signal lines 15. The control board 12 is mounted on the reinforcement members 13a and 13b on the rear face of the plasma display panel 11 by mounting members 16. The control board 12 is formed as a circuit board module on which a large number of electronic parts 12a such as IC chips are mounted. Here, the plasma display panel 11 serves as light emitting display plate, and the optical sensors 14a to 14d serve as light detection means.

Figure 3:
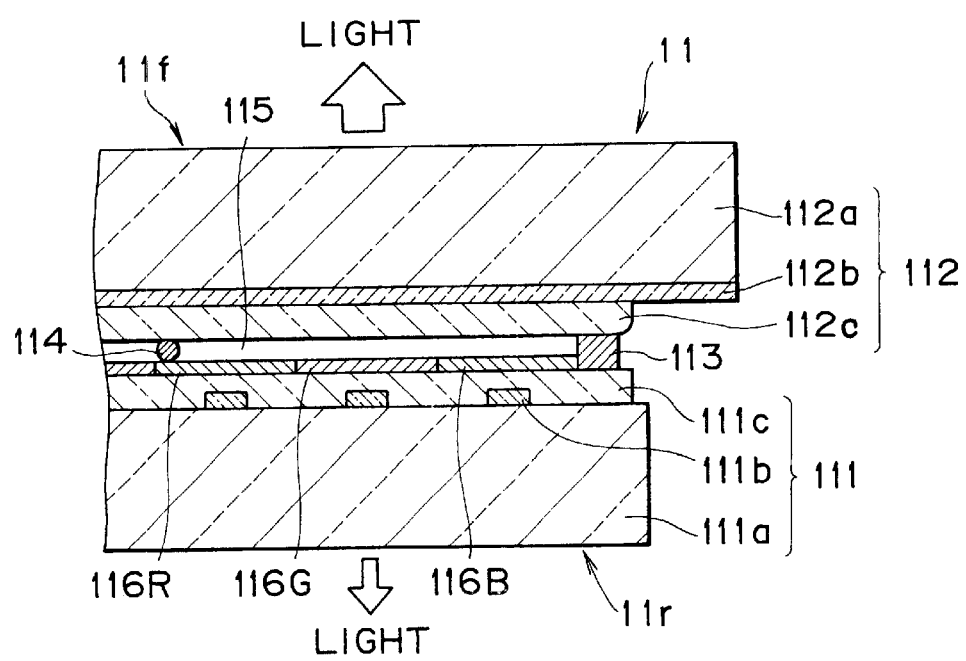
FIG. 3 is an enlarged sectional view of part of a plasma display panel shown in FIG. 1.

Referring now to FIG. 3, there is shown a sectional structure of the plasma display panel 11. The plasma display panel 11 shown is formed as an AC type plasma display panel wherein plasma light is emitted by application of an AC electric field, and includes a rear face side board element 111, a display face side board element 112 disposed in an opposing relationship-to the rear face side board element 111 with a fixed distance left therebetween, a frame-spacer member 113 interposed between the two board elements and serving as a frame and a spacer for keeping the two boards in a fixed spaced relationship from each other so that predetermined gas is enclosed in a space 115 defined between the two boards, and a suitable number of pacers 114 provided for keeping the distance between the two board elements fixed.

The rear face side board element 111 includes a transparent glass substrate 111a, transparent electrodes 111b provided at fixed intervals on the glass substrate 111a and extending in one direction (which is hereinafter referred to as x-axis direction), and a transparent dielectric film 111c formed on the glass substrate 111a in such a manner as to cover over the transparent electrodes 111b. On the transparent dielectric film 111c, a fluorescent film 116R for the R color, another fluorescent film 116G for the G color and a further fluorescent film 116B for the B color are alternately formed in repetitive stripes in a corresponding relationship to the positions at which the transparent electrodes 111b are formed. Meanwhile, the display face side board element 112 includes a glass substrate 112a, transparent electrodes 112b provided at fixed intervals on the glass substrate 112a and extending in a direction (which is hereinafter referred to as y-axis direction) perpendicular to the x-axis direction, and a transparent dielectric film 112c formed on the glass substrate 112a in such a manner as to cover over the transparent electrodes 112b. The rear face side board element 111 and the display face side board element 112 are disposed such that the transparent dielectric films 111c and 112c thereof may oppose each other.

For the gas to be enclosed in the space 115 between the rear face side board element 111 and the display face side board element 112, for example, a gas which consists principally of neon (Ne) containing argon (Ar) may be used.

In the plasma display panel 11, when an AC electric field higher than a predetermined voltage is selectively applied between the transparent electrodes 111b and the transparent electrodes 112b in response to an image signal, plasma discharge occurs in the enclosed gas at intersecting points of the electrodes to emit light. The light emitted hits on the fluorescent films 116R, 116G and 116B, whereupon lights of the individual colors are generated. While most of the light generated by the light generation phenomenon is discharged from a display face 11f of the plasma display panel 11, part of the light (for example, approximately ten and several percent of the generated light) is discharged also from the rear face 11r.

Figure 4:
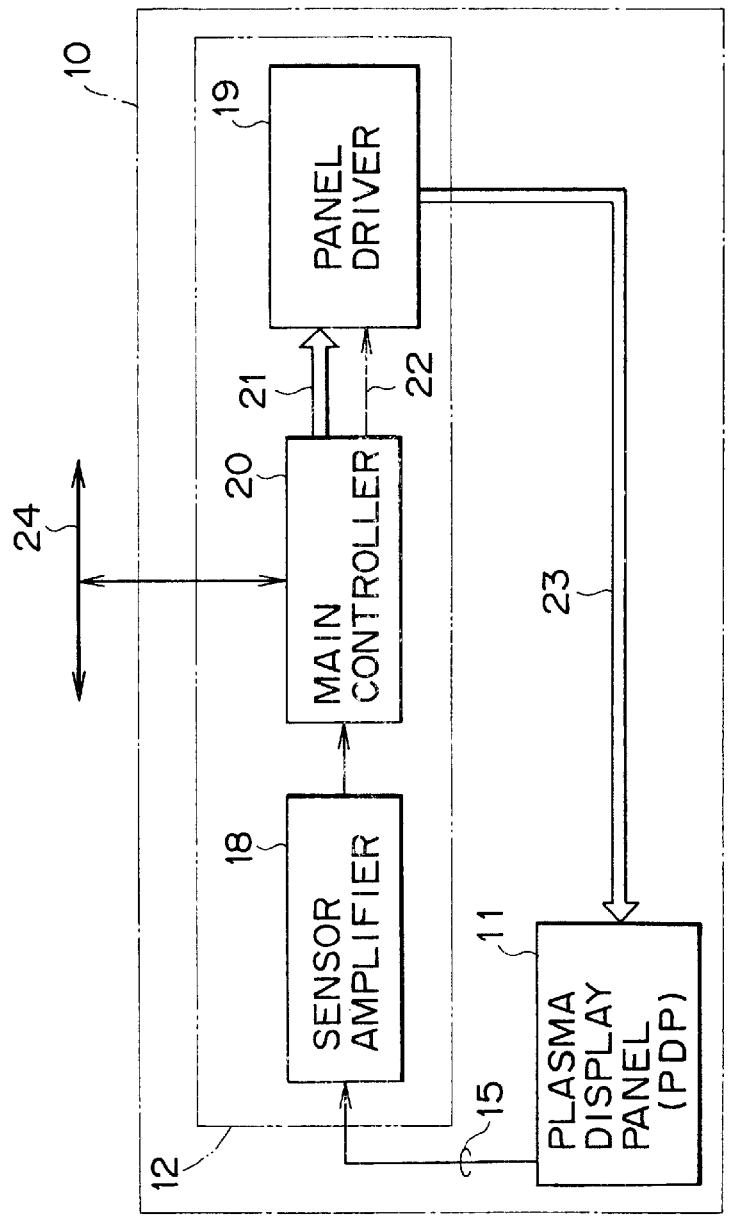
FIG. 4 is a block diagram showing a general circuit construction of the plasma display panel unit of FIG. 1.

Referring now to FIG. 4, there is shown a general circuit construction of the control board 12 mounted on the plasma display panel unit 10. The control board 12 shown includes a sensor amplifier 18 for individually amplifying output signals of the optical sensors 14a to 14d (FIGS. 1 and 2), a panel driver 19 for driving the plasma display panel 11 to display, and a main controller 20 for controlling the entire plasma display panel unit 10. The main controller 20 supplies image data 21 representative of an image to be displayed and various control data 22 necessary to drive the plasma display panel 11 to the panel driver 19. Further, the main controller 20 can communicate with a central control unit (not shown) disposed remotely through a network 24. The panel driver 19 drives the plasma display panel 11 with drive data 23. The main controller 20 serves as automatic adjustment means.

Figure 5:
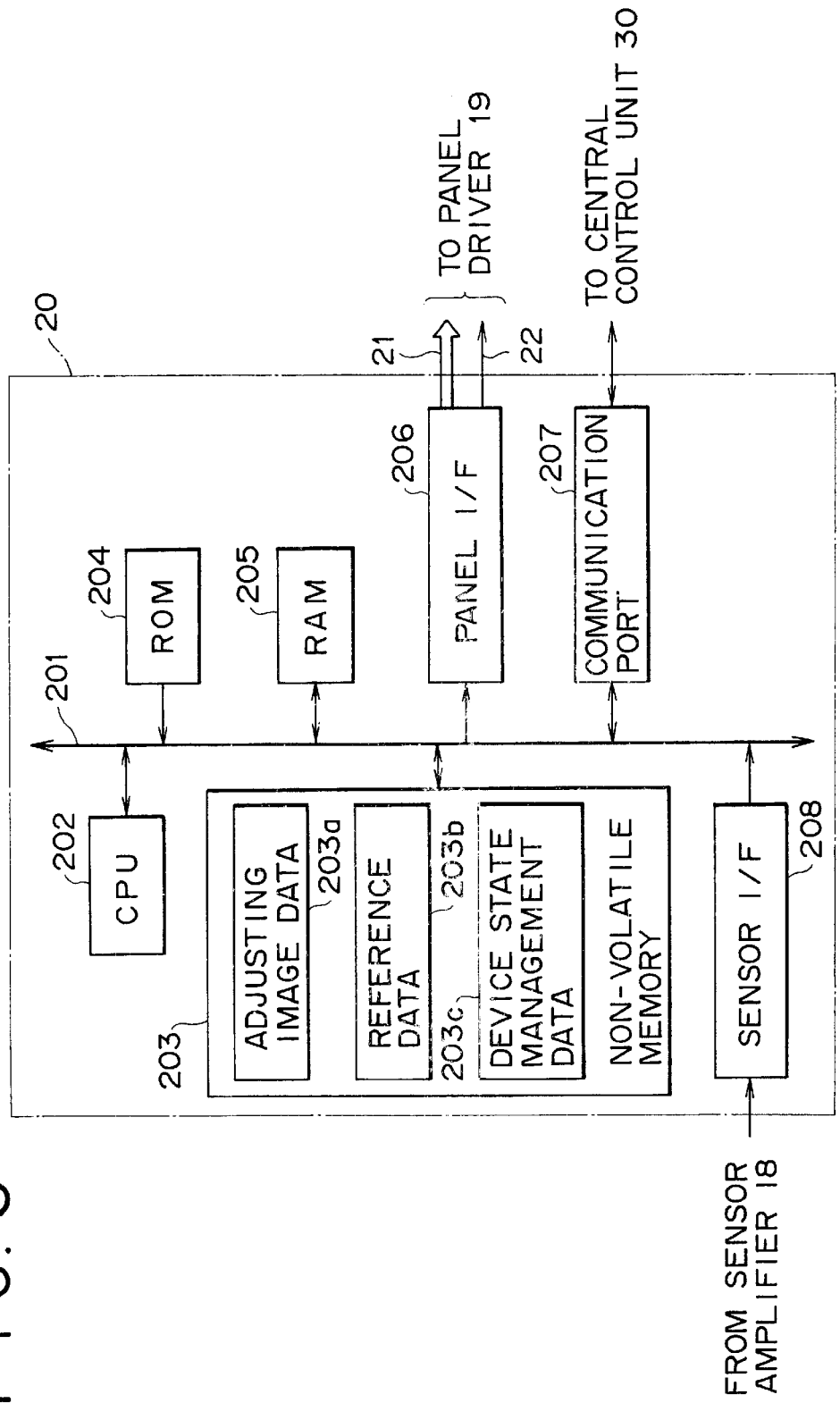
FIG. 5 is a block diagram showing a circuit construction of a main controller shown in FIG. 4.

Referring now to FIG. 5, there is shown a circuit construction of the main controller 20 shown in FIG. 4. The main controller 20 includes a central processing unit (CPU) 202, a non-volatile memory 203 for storing various data which will be hereinafter described, a read only memory (ROM) 204 in which an operation program for the CPU 202 and so forth are stored, a random access memory (RAM) 205 serving as a working memory, a panel interface (I/F) 206, a communication port 207 and a sensor interface (I/F) 208, all connected to each other by an internal bus 201.

The CPU 202 receives image information of an object of display from the network 24 and sends out the image information to the panel driver 19, effects necessary data communication with the central control unit (not shown in FIG. 5) through the network 24, and effects control for checking or adjustment of the display state of the plasma display panel 11 based on outputs of the optical sensors 14a to 14d.

The non-volatile memory 203 is a memory such as, for example, an EEPROM (electrically erasable programmable ROM), and stores adjusting image data 203a corresponding to a test image to be displayed upon adjustment and reference data 203b to be compared with the outputs of the optical sensors 14a to 14d (more accurately, display state detection data inputted from the sensor amplifier 18 through the sensor I/F 208) upon adjustment and accumulates device state management data 203c for managing a state of the plasma display panel 11 which are produced as operation proceeds and so forth. The non-volatile memory 203 serves as maintenance management information holding, and the device state management data 203c is used as apparatus maintenance management information.

The panel I/F 206 is connected to the panel driver 19, and converts image data and/or control data from the CPU 202 into image data 21 and control data 22 which have a form which can be utilized by the panel driver 19 and outputs the image data 21 and the control data 22. The communication port 207 is connected to the network 24 and performs transmission and reception of data to and from the central control unit (not shown in FIG. 5). The sensor I/F 208 converts analog outputs of the sensor amplifier 18 (FIG. 4) into digital signals and performs predetermined waveform shaping and so forth for the digital signals.

Figure 6:
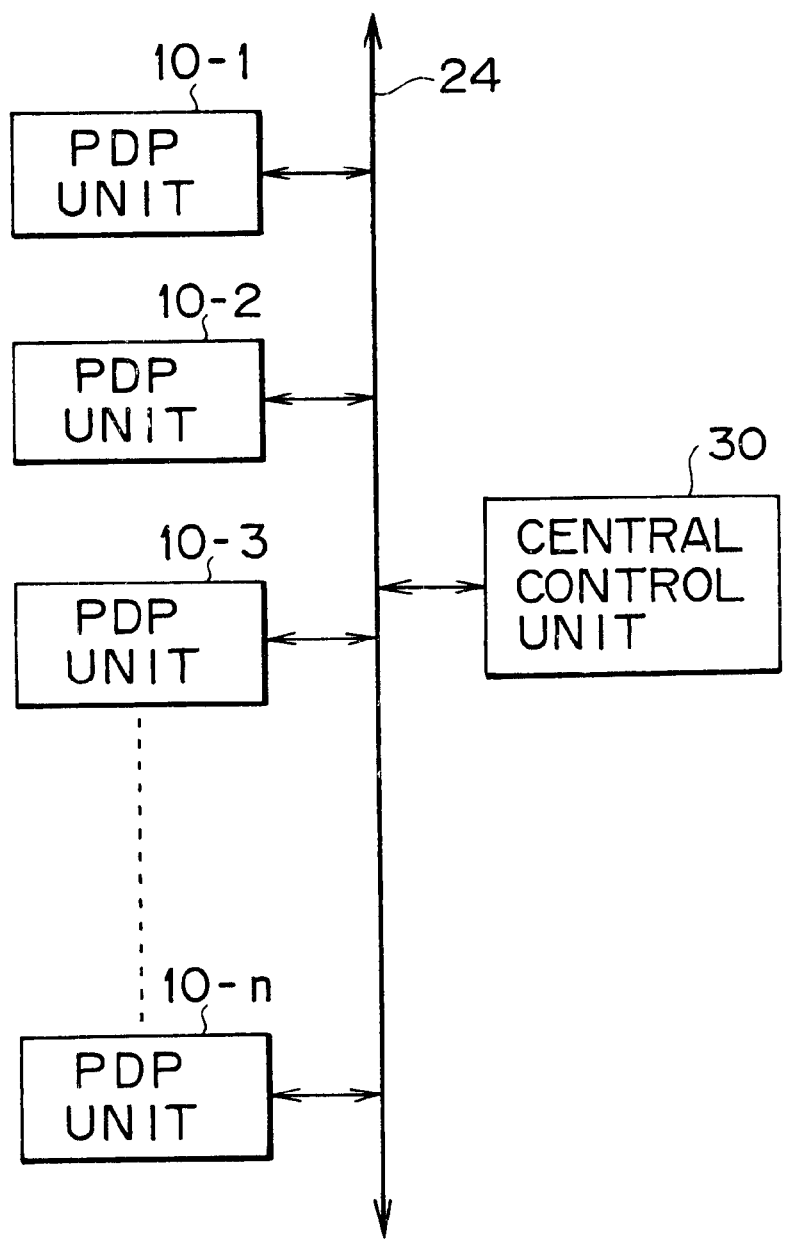
FIG. 6 is a block diagram showing a general construction of an information display system which includes the plasma display unit of FIG. 4.

Referring now to FIG. 6, there is shown a general construction of an information display system which includes the plasma display panel unit 10 shown in FIG. 4. In particular, the system shown includes a large number of plasma display panel units 10-1 to 10-n and a single central control unit 30 which are connected to a network 24. The plasma display panel units 10-1 to 10-n all have a construction similar to that of the plasma display panel unit 10 described above with reference to FIGS. 1 to 5. The central control unit 30 sends information to be displayed to the plasma display panel units 10-1 to 10-n through the network 24 and sends an instruction periodically or suitably in accordance with the necessity to the plasma display panel units 10-1 to 10-n to request to send out device state management data 203c accumulated therein. Each of the plasma display panel units 10-1 to 10-n reads out a required portion of the device state management data 203c accumulated in the non-volatile memory 203 in the main controller 20 therein in response to a request from the central control unit 30 and sends out the read out required data portion to the central control unit 30, and changes the reference data 203b in the non-volatile memory 203 in response to an adjustment value variation instruction from the central control unit 30.

FIG. 7 illustrates contents of the device state management data 203c stored in the non-volatile memory 203 of FIG. 5. The device state management data 203c include a device ID for identification of the plasma display panel unit 10, an accumulated energization time indicative of a total time spent for energization, adjustment history data which represent an accumulated history of adjustment of the display state of the plasma display panel 11, and failure history data which represent an accumulated history of failures having occurred with the plasma display panel 11.

The adjustment history data include date?hours when adjustment is performed, adjustment items (items with regard to which adjustment is performed actually), and adjustment values (values after adjustment), which make one set of data. Here, as an adjustment item, for example, a brightness of each of the colors of R, G and B, a color temperature, a white balance representative of a balance among the colors of R, G and B, a contrast or the like may be used. Meanwhile, the adjustment value particularly is the magnitude of AC voltage to be applied between the transparent electrodes 111b and 112b of FIG. 3.

The failure history data include date?times when a failure occurs, failure contents, and countermeasure contents, which make one set of data. The failure contents include a case wherein, when adjustment of the display state of the plasma display panel 11 is performed, adjustment cannot be achieved to such a degree that a display state in a predetermined range is reached.

Now, operation of the information display apparatus having the construction described above is described with reference to FIGS. 8, 9 and 10 which illustrate contents of an initial operation upon starting, contents of an automatic adjustment operation, and contents of a communication process performed between the plasma display panel unit 10 and the central control unit 30, respectively.

Figure 8:
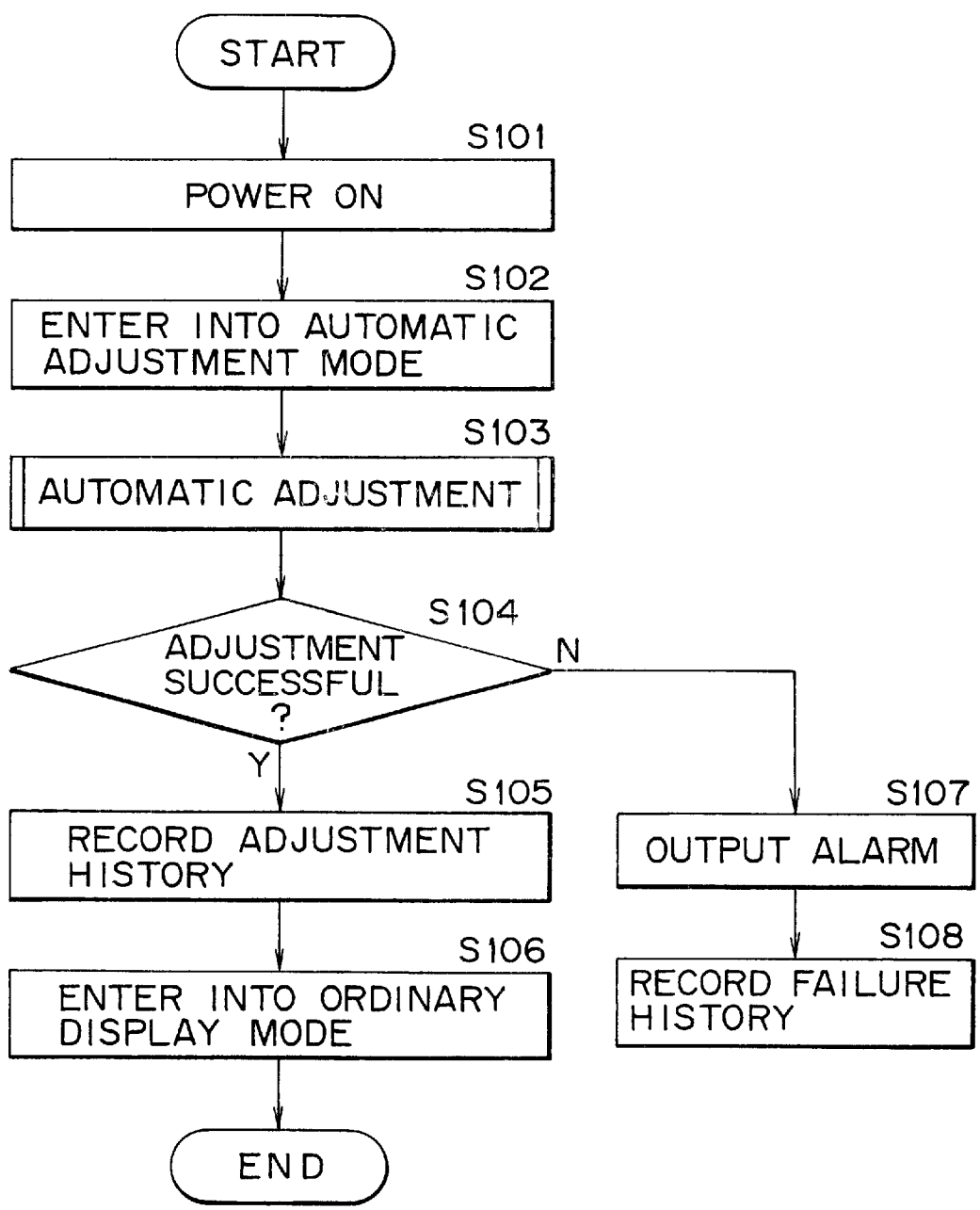
FIG. 8 is a flow chart illustrating an initial operation of the plasma display panel unit of FIG. 4 upon starting.

First, an initial operation upon starting is described with reference to FIG. 8. After the power supply is turned on in response to an instruction from the central control unit 30 (step S101), the plasma display panel unit 10 enters an automatic adjustment mode (step S102) and then performs automatic adjustment by such a procedure as illustrated in FIG. 9 (step S103).

Figure 9:
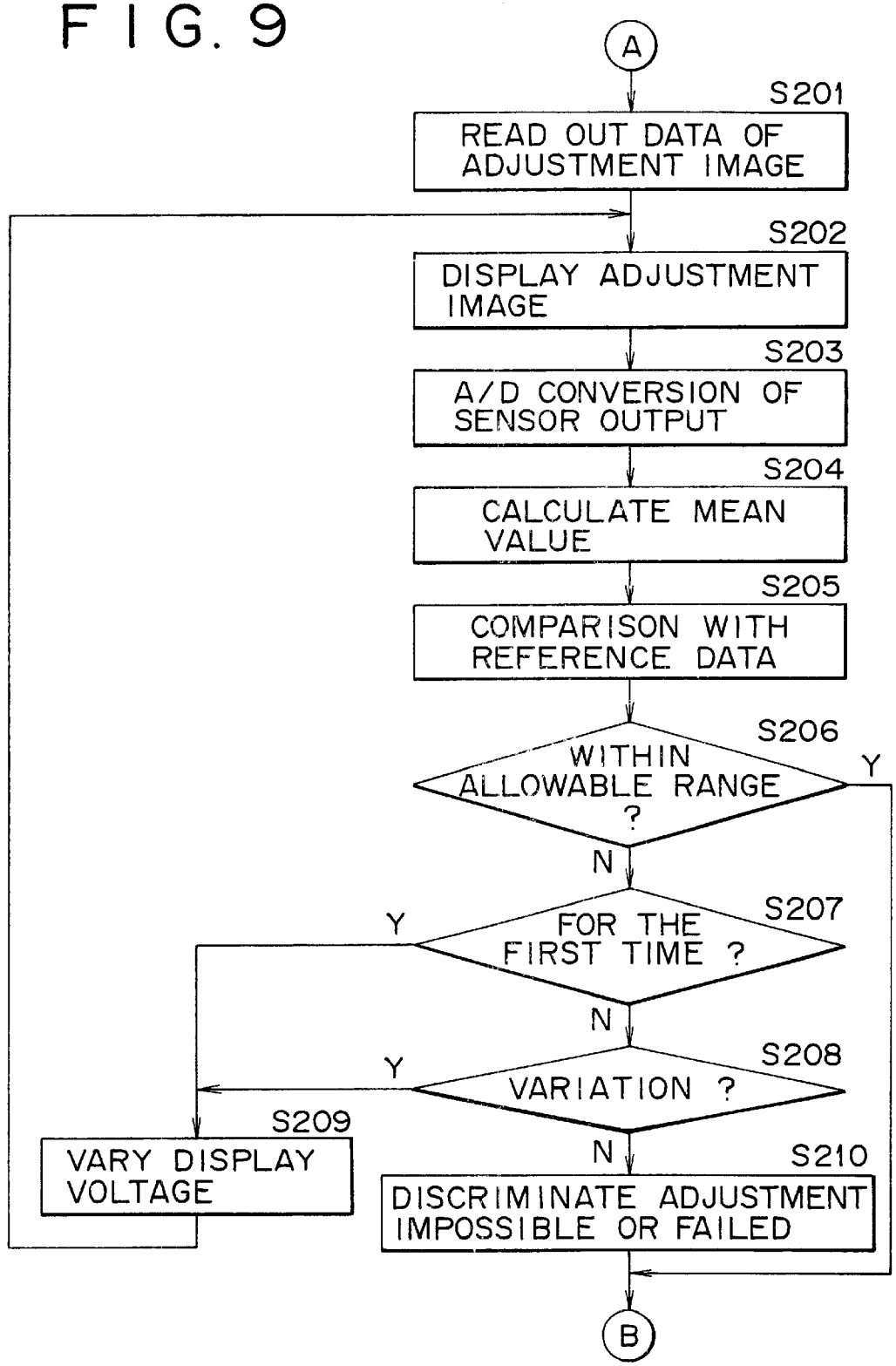
FIG. 9 is a flow chart illustrating an automatic adjustment step illustrated in FIG. 8.

Referring now to FIG. 9, the CPU 202 of the main controller 20 reads out the adjusting image data 203a from the non-volatile memory 203 (step S201) and sends the adjusting image data 203a to the panel driver 19 so that an image for adjustment is displayed on the plasma display panel 11 (step S202). In this instance, for example, for adjustment of the white balance, display voltages for color images of R, G and B are set equal to one another to effect display of the white. On the other hand, for adjustment of the color temperature regarding a certain color (for example, the color of R), only the display voltage for the color image of R is rendered effective while the display voltages for the other two colors (G and B colors) are turned off.

In this condition, the optical sensors 14a to 14d individually output detection signals corresponding to intensities of light discharged to the rear face 11r side of the plasma display panel 11. In this instance, it is considered that the intensity of light discharged to the rear face 11r side of the plasma display panel 11 is in a proportional relationship to the intensity of light discharged to the display face 11f side at the same position on the screen. Accordingly, to effect adjustment of the display state of the plasma display panel 11 based on the intensity of light discharged to the rear face 11r side is substantially equivalent to effect adjustment based on light actually discharged to the display face 11f side.

The detection signals outputted from the optical sensors 14a to 14d are individually amplified by the sensor amplifier 18 and inputted to the main controller 20. The detection signals inputted to the main controller 20 are sampled at suitable time intervals and converted into digital data by the sensor I/F 208 (step S203). The CPU 202 calculates an average value of the sensor output data (step S204) and compares the average value with the reference data 203b read out from, the non-volatile memory 203 (step S205). As a result, when the calculated average value remains within an allowable range (Yes in step S206), the control returns to step S201 to perform an adjustment procedure for a next adjustment item.

On the other hand, if, although the calculated average value does not fall within the allowable range (No in step S206), the current adjustment loop is the first pass loop in the adjustment mode (Yes in step S207), or if, although the current adjustment loop is the second pass or following loop, the average value exhibits a variation from the average value calculated in the preceding loop (Yest in step S208), the CPU 202 varies the display voltage, that is, the adjustment value (step S209), whereafter the control returns to step S202. In contrast, if the current adjustment loop is the second pass or following loop (No in step S207) and the average value does not exhibit a variation from the average value in the preceding loop (No in step S208), it is discriminated that the adjustment of the plasma display panel 11 is impossible or the plasma display panel 11 is in failure (step S210), and the control advances to step S104 of FIG. 8.

Adjustment is performed for each adjustment item in accordance with the steps from A to B of FIG. 9 in this manner.

Description is given referring back again to FIG. 8. If adjustment comes to an end regularly as a result of the adjustment procedure described above (Yes in step S104), then the CPU 202 determines the display voltages each set in the last loop in the adjustment procedure for each adjustment item as adjustment values and records the adjustment values together with the adjustment items and the adjustment date?hours as an adjustment history into the non-volatile memory 203 (step S105). Then, an ordinary display mode is entered (step S106).

On the other hand, if the adjustment does not come to an end regularly as a result of the adjustment procedure described above (No in step S104), then the CPU 202 sends out an alarm signal for notification of the fact that adjustment of the plasma display panel 11 is impossible or the plasma display panel 11 is in failure to the central control unit 30 through the network 24 (step S107) and writes the adjustment item, with which adjustment has been impossible, together with the date?hour as failure history data into the non-volatile memory 203 (step S108). It is to be noted that, if a countermeasure such as replacement of a part is performed thereafter, then the contents of the countermeasure are additionally recorded into the corresponding failure history data.

Figure 10:
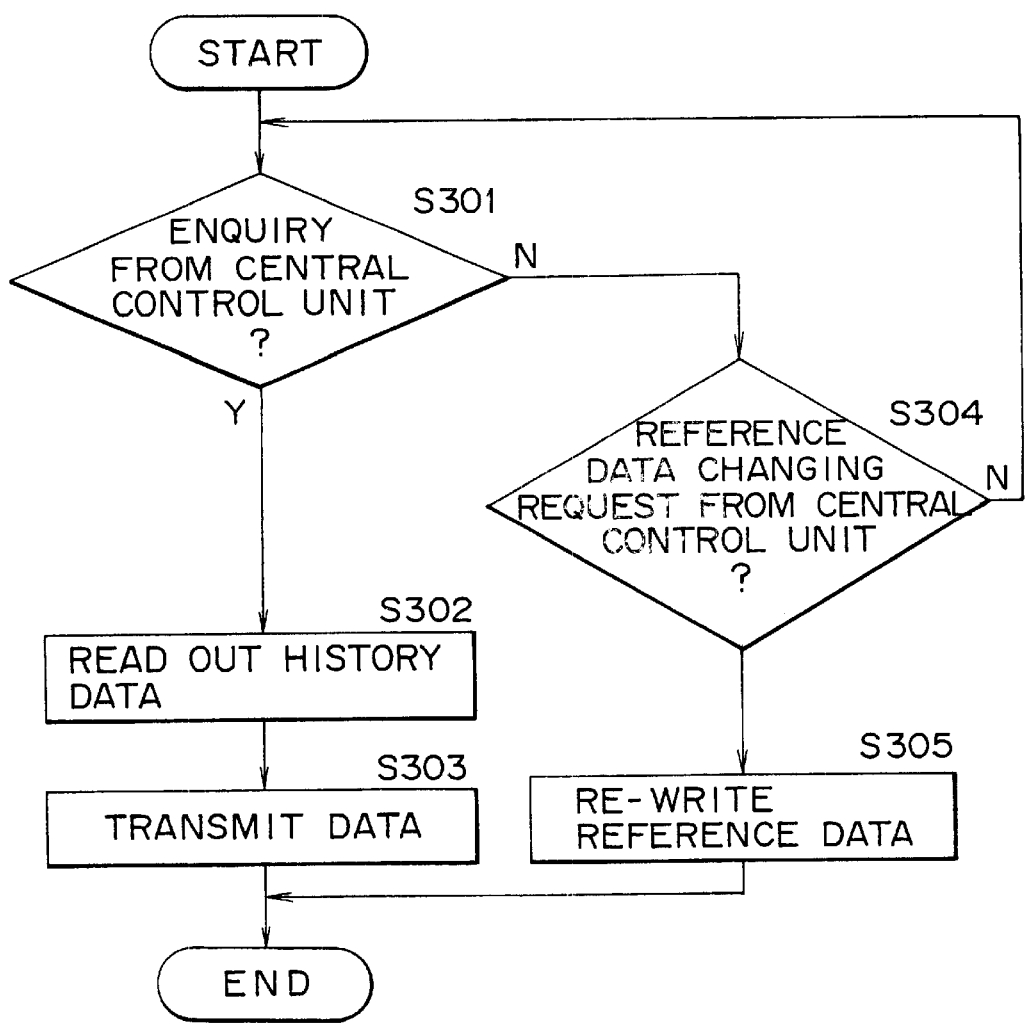
FIG. 10 is a flow chart illustrating processing of the plasma display panel unit side which is performed in response to an instruction from a central control unit.

Subsequently, a communication procedure performed between the plasma display panel unit 10 and the central control unit 30 is described with reference to FIG. 10.

The CPU 202 of the main controller 20 supervises an instruction sent thereto from the central control unit 30 through the network 24. Then, if an instruction for enquiry for contents of a history is received (Yes in step S301), then the CPU 202 reads out the accumulated energization time, adjustment history data and failure history data from the non-volatile memory 203 (step S302) and sends out the read out data together with the device ID to the central control unit 30 through the network 24 (step S303).

On the other hand, if a reference data variation instruction is received from the central control unit 30 (No in step S301 or No in step S304), then the CPU 202 rewrites the reference data 203b in the non-volatile memory 203 to instructed contents (step S305). Consequently, after that, in an initial operation upon starting, adjustment of the display state of the plasma display panel 11 is performed in accordance with the thus varied reference data 203b.

In this manner, with the information display apparatus according to the present embodiment, since the optical sensors 14a to 14d are disposed on the rear face 11r side of the plasma display panel 11 and catch rear face side outgoing light, which increases in proportion to the outgoing light amount to the display face 11f side of the plasma display panel 11, to detect a panel display state such as a brightness or a color temperature, also upon ordinary information displaying, the presence of the optical sensors 14a to 14d does not make an obstacle when the display screen is observed. Besides, since the optical sensors 14a to 14d are disposed steadily, an operation to dispose an optical sensor and connect it to an adjustment apparatus for exclusive use each time adjustment is to be performed is not required, and maintenance management is facilitated very much and the cost required for the maintenance management can be reduced remarkably. Further, since the display state of the plasma display panel 11 is detected directly by the optical sensors 14a to 14d, the accuracy in detection is raised. Besides, since automatic adjustment is performed every time the apparatus is started, the display image quality can always be kept in the best state. Further, since the apparatus itself outputs an alarm when adjustment is impossible, the extermination of the life of the apparatus can be notified of with certainty in an early stage. Furthermore, since an adjustment history or a failure history is accumulated, grasping of aged deterioration such as a drop of brightness by degradation of the fluorescent substance, prediction of the life of the apparatus and so forth can be performed precisely. Further, since the different plasma display panel units 10 are connected to the central control unit 30 by the network 24, such a large number of plasma display panel units as 10-1 to 10-n can be managed in a concentrated manner from a remote place.

While the present invention is described above in connection with the preferred embodiment, the present invention is not limited to the specific embodiment, and variable modifications can be made to the embodiment. For example, while the number of optical sensors is 4 in the embodiment described above, a smaller or larger number of optical sensors may be provided. Further, the optical sensors may be formed in a line-type shape and disposed in rows and columns such that an average brightness over the overall area of the plasma display panel 11 may be detected. Furthermore, it is also possible to form a surface type optical sensor from a transparent light guiding plate which can guide light incoming from one face to an end face and a line type optical sensor which detects light outgoing from the end face of the light guiding plate and dispose the surface type optical sensor to the rear face of the plasma display panel 11 to utilize the sensor output. In this instance, an average brightness over the overall area of the plasma display panel 11 can be detected with a higher degree of accuracy.

Further, the optical sensors need not be color sensors but may be monochromatic sensors. In this instance, monochromatic display of each of the colors of R, G and B is performed successively to detect the brightness of each of the three colors, and a white balance may be calculated by calculation.

Further, while, in the embodiment described above, adjustment is performed based on an average value of four optical sensor outputs, the outputs of the optical sensors may additionally be utilized independently to effect adjustment which is different depending upon the position on the plasma display panel 11. This makes also such adjustment as to correct a non-uniform brightness distribution or color distribution on the panel possible. In this instance, if the number of optical sensors is increased suitably, adjustment is possible also where a non-uniform brightness distribution pattern is very small.

Further, while, in the embodiment described above, adjustment principally regarding the brightness is performed, it is also possible to perform adjustment for the positional displacement or size of an effective display area.

Further, while, in the embodiment described above, automatic adjustment is performed in an initial operation upon starting, it is possible to alternatively insert an adjustment image momentarily in such a short time as does not make an obstacle to the sense of vision and effect adjustment through the optical sensor outputs corresponding to the adjustment image. In this instance, since adjustment can be performed not only upon starting but also at an arbitrary time, adjustment can be performed in a high frequency and the display quality can be kept always good.

Further, while, in the embodiment described above, the large number of plasma display panel units 10-1 to 10-n are remotely managed from the central control unit 30 through the network 24, the plasma display panel units 10 may be coupled directly to the central control unit 30 by dedicated lines without using the network 24. Furthermore, a display unit, an operation unit and so forth for maintenance management may be provided for each of the plasma display panel units 10 without providing the central control unit 30 such that maintenance management such as alarm display, variation processing of reference data and so forth may be performed locally. Further, while, in the embodiment described above, the plasma display panel unit 10 sends out history data in response to an enquiry from the central control unit 30, history data may be sent out voluntarily or periodically from the plasma display panel unit 10 to the central control unit 30. Furthermore, not only history data, but also display state detection data detected by the optical sensors 14a to 14d may be sent out as they are.

While, in the embodiment described above, the plasma display panel 11 is described as being a plasma display panel of the AC type, it may alternatively be of the DC type. Furthermore, the present invention can be applied also to a display device other than a plasma display panel only if the display-device discharges light corresponding to a display light amount also to the face on the opposite side to the display face.

What is claimed is:

1. An information display apparatus, comprising:

a light emitting display plate having a shape of a flat plate and being filled with gas for generating light in an inside thereof in response to information given thereto and radiating the internally generated light to both of front and rear face sides of said light emitting display plate;

display state detecting light detection means provided on the rear face side different from a display face side of said light emitting display plate for detecting the light generated to the rear face side and providing display state detection information corresponding to the detected light, wherein said display state detection information is indicative of a display state including one of brightness, contrast, and color temperature of an image displayed on the display face of said light emitting display plate and automatic adjustment means for automatically adjusting a display state of said light emitting display plate based on the display state detection information provided by said display state detecting light detection means.

2. The information display apparatus according to claim 1, wherein said automatic adjustment means outputs an alarm when the adjustment thereby has failed.

3. The information display apparatus according to claim 1, further comprising maintenance management information holding means for holding apparatus maintenance management information including a history of adjustment performed by said automatic adjustment means.

4. The information display apparatus according to claim 3, further comprising outputting means for outputting the apparatus maintenance management information held by said maintenance management information holding means or the display state detection information outputted from said light detection means to the outside.

5. The information display apparatus according to claim 4, wherein said outputting means is connected to a central control unit provided for controlling and managing a plurality of information display apparatus of a similar type.

6. A display state adjustment method for an information display apparatus for detecting a display state of said information display apparatus, said information display apparatus including a light emitting display plate having a shape of a flat plate and being filled with gas for generating light in an inside thereof in response to information given thereto and radiating the internally generated light to both of front and rear face sides of said light emitting display plate, the display state adjustment method comprising the steps of:

detecting light on the rear face side different from a display face side of said light emitting display plate and providing information corresponding to the detected light;

detecting a display state including one of brightness, contrast, and color temperature of said light emitting display plate based on said information provided by said step of detecting light, with said display state of said light emitting display plate being indicative of a state of an image displayed on the display face side of said light emitting display plate; and automatically adjusting said one of brightness, contrast, and color temperature of said light emitting display plate based on the detected display state detected by said step of detecting a display state.

7. A maintenance management method for an information display apparatus for detecting a display state of said information display apparatus, said information display apparatus including a light emitting display plate having a shape of a flat plate and being filled with gas for generating light in an inside thereof in response to information given thereto and radiating the internally generated light to both of front and rear face sides of said information display apparatus, the display state adjustment method comprising the steps of:

detecting light on the rear face side different from a display face side of said light emitting display plate and providing information corresponding to the detected light;

detecting a display state of said light emitting display plate based on said information provided by said step of detecting light and providing display state detection information, with said display state of said light emitting display plate being indicative of a state of an image displayed on the display face side of said light emitting display panel;

automatically adjusting the display state including one of brightness, contrast, and color temperature of said light emitting display plate based on the display state detection information and storing apparatus maintenance management information including a history of automatic adjustment; and performing maintenance management of said information display apparatus suitably referring to said apparatus maintenance management information.

8. A maintenance management method for an information display apparatus according to claim 7, further comprising the step of sending out the apparatus maintenance management information held by said maintenance management information holding means or the display state detection information outputted from said light detection means to a central control unit provided for controlling and managing a plurality of information display apparatus of a similar type so that the maintenance management of said information display apparatus may be performed by said central control unit.

* * * * *